(12) United States Patent
Chu et al.

(10) Patent No.: US 11,251,609 B2
(45) Date of Patent: Feb. 15, 2022

(54) SURGE PROTECTION APPARATUS

(71) Applicant: ELECTRONICS AND TELECOMMUNICATIONS RESEARCH INSTITUTE, Daejeon (KR)

(72) Inventors: Kwanguk Chu, Daejeon (KR); Jinha Yoo, Daejeon (KR); Namwon Moon, Gwangju (KR); Seung-Kab Ryu, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 203 days.

(21) Appl. No.: 16/550,432

(22) Filed: Aug. 26, 2019

(65) Prior Publication Data

US 2020/0076188 A1 Mar. 5, 2020

(30) Foreign Application Priority Data

Aug. 31, 2018 (KR) .................. 10-2018-0103257
Jun. 28, 2019 (KR) .................. 10-2019-0077955

(51) Int. Cl.
*H02H 9/04* (2006.01)
*G21J 1/00* (2006.01)

(52) U.S. Cl.
CPC .............. *H02H 9/042* (2013.01); *G21J 1/00* (2013.01)

(58) Field of Classification Search
CPC ............ H02H 9/02; H02H 9/04; H02H 9/041; H02H 9/042; H02H 9/043; H02H 9/046; H02H 3/20; H02H 3/22; H02H 3/26; H02H 1/04; H02H 1/043
See application file for complete search history.

(56) References Cited

U.S. PATENT DOCUMENTS

| | | | | |
|---|---|---|---|---|
| 5,079,455 | A * | 1/1992 | McCafferty | H03K 17/0822 323/908 |
| 6,392,463 | B1 | 5/2002 | Kitagawa et al. | |
| 8,223,468 | B2 * | 7/2012 | Januszewski | H02H 9/005 361/111 |
| 8,681,467 | B2 | 3/2014 | Chu et al. | |
| 2008/0192396 | A1 | 8/2008 | Zhou et al. | |

FOREIGN PATENT DOCUMENTS

| | | |
|---|---|---|
| JP | 09-056058 A | 2/1997 |
| JP | 2001-160748 A | 6/2001 |
| KR | 10-1999-0075548 A | 10/1999 |
| KR | 10-1171228 B1 | 8/2012 |
| KR | 10-2012-0120685 A | 11/2012 |
| KR | 10-1198413 B1 | 11/2012 |
| KR | 10-1217031 B1 | 1/2013 |
| KR | 10-2017-0119628 A | 10/2017 |
| WO | 1999/049703 A1 | 9/1999 |

* cited by examiner

*Primary Examiner* — Nguyen Tran
(74) *Attorney, Agent, or Firm* — LRK Patent Law Firm

(57) ABSTRACT

A surge protection apparatus includes a signal determination unit configured to generate a control signal by detecting a surge on a power line, and a switching unit connected between the power line and a ground terminal and configured to include a power transistor that is turned on in response to the control signal.

12 Claims, 23 Drawing Sheets

SURGE PROTECTION APPARATUS

CROSS REFERENCE TO RELATED APPLICATIONS

This application claims the benefit of Korean Patent Application Nos. 10-2018-0103257, filed Aug. 31, 2018, and 10-2019-0077955, filed Jun. 28, 2019, which are hereby incorporated by reference in their entireties into this application.

BACKGROUND OF THE INVENTION

1. Technical Field

The present invention relates generally to a surge protection apparatus suitable for a High-altitude Electro-Magnetic Pulse (HEMP) protection apparatus.

2. Description of the Related Art

Generally, when a nuclear explosion occurs at an altitude of 30 km or more, radiation reacts with an ionization layer in the air, and then energy is transformed into electromagnetic waves that reach the ground. Such an electromagnetic wave is called a High-Altitude Electromagnetic Pulse (HEMP). When a HEMP meets a power line, which is a conductor, it is coupled to free electrons in the power line, thus inducing a strong pulse current, by which electronic devices connected to the power line malfunction or break down. In order to prevent damage attributable to such a HEMP, a HEMP protection apparatus, which satisfies insertion loss and Pulse Current Injection (PCI) test requirements presented in the U.S. military standard MIL-STD-188-125-1, is installed on a power line. The HEMP protection apparatus for a power line is composed of a surge protection apparatus and a Radio-Frequency Interference (RFI) filter.

PRIOR ART DOCUMENTS

Patent Documents (Patent Document 1) Korean Patent No. 10-1217031, Date of Registration: Dec. 24, 2012, Title: Overvoltage Protection Circuit and Apparatus of Filter for EMP Shelter (Patent Document 2) Korean Patent No. 10-1171228, Date of Registration: Jul. 31, 2012, Title: Protection Devices for Power Line against High-altitude Electromagnetic Pulse

SUMMARY OF THE INVENTION

Accordingly, the present invention has been made keeping in mind the above problems occurring in the prior art, and an object of the present invention is to provide a surge protection apparatus that decreases the leakage current and the voltage drop of an RFI filter by more sufficiently reducing a pulse current in a PCI.

The objects of the present invention are not limited to the above-described objects, and other objects, not described here, will be clearly understood by those skilled in the art from the following descriptions.

In accordance with an aspect of the present invention to accomplish the above object, there is provided a surge protection apparatus, including a signal determination unit configured to generate a control signal by detecting a surge on a power line; and a switching unit connected between the power line and a ground terminal and configured to include a power transistor that is turned on in response to the control signal.

In an embodiment, the power transistor may be implemented as any one of an Insulated Gate Bipolar Transistor (IGBT), a Bipolar Junction Transistor (BJT), a Metal Oxide Semiconductor Field Effect Transistor (MOSFET), a thyristor, and a Silicon carbide (SiC) transistor.

In an embodiment, the signal determination unit may include a first capacitor connected to the power line; a first resistor connected between the first capacitor and a gate of the power transistor; a second resistor connected between the gate of the power transistor and the ground terminal; and a Zener diode connected between the ground terminal and the gate of the power transistor.

In an embodiment, the switching unit may further include a first diode connected between the power line and a collector of the power transistor; and a second diode connected between the ground terminal and the collector of the power transistor.

In an embodiment, the surge protection apparatus may further include an inductor connected to the power line; and a capacitor connected between the inductor and the ground terminal.

In an embodiment, the surge protection apparatus may further include an overvoltage protection element including an input inductor connected to the power line; and a Metal Oxide Varistor (MOV) connected between the input inductor and the ground terminal.

In an embodiment, the switching unit may further include a first diode connected between an emitter and a collector of the power transistor; a second diode connected to the power line; a fuse connected between the second diode and the collector of the power transistor; and a current transformer connected between the emitter of the power transistor and the ground terminal.

In an embodiment, the signal determination unit may include a second capacitor connected between a gate of the power transistor and the ground terminal; a third capacitor connected to the power line; a second resistor connected between the gate of the power transistor and the ground terminal; a third resistor connected to the third capacitor; a third diode connected between the third resistor and the gate of the power transistor; and a Zener diode between the ground terminal and the gate of the power transistor.

In an embodiment, the signal determination unit may include a second capacitor connected between a gate of the power transistor and the ground terminal; a third capacitor connected to the collector of the power transistor; a second resistor connected between the gate of the power transistor and the ground terminal; a third resistor connected to the third capacitor; a third diode connected between the third resistor and the gate of the power transistor; and a Zener diode connected between the ground terminal and the gate of the power transistor.

In accordance with another aspect of the present invention to accomplish the above object, there is provided a surge protection apparatus, including a switching unit connected between a first power line and a ground terminal; and a signal determination unit connected between the first power line and a first terminal, and configured to generate a control signal by detecting a surge on the first power line, wherein the switching unit includes a power transistor for connecting a first node to the first terminal in response to the control signal so as to electrically connect the first power line to the ground terminal and wherein the first terminal is a terminal for detecting a fault in or damage to the power transistor.

In an embodiment, the switching unit may further include a fuse connected to the first node; a first diode connected between the first power line and the fuse; a second diode connected between the first terminal and the first node; a fourth diode connected between the first terminal and the ground terminal; a third capacitor connected between the first terminal and the ground terminal; and a third resistor connected between the first terminal and the ground terminal.

In an embodiment, the switching unit may further include a fifth diode connected between a second power line and the fuse.

In an embodiment, the signal determination unit may include a first capacitor connected to the first power line; a second capacitor connected between a gate of the power transistor and the first terminal; a first resistor having a first end connected to the first capacitor; a second resistor connected between the gate of the power transistor and the first terminal; a third diode connected between a second end of the first resistor and the gate of the power transistor; and a Zener diode connected between the first terminal and the gate of the power transistor.

In an embodiment, the signal determination unit may further include a fourth capacitor connected to a second power line; and a fourth resistor connected between the fourth capacitor and the third diode.

In accordance with a further aspect of the present invention to accomplish the above object, there is provided a surge protection apparatus, including a switching unit connected between a first power line and a ground terminal; and a signal determination unit connected between a first node and a first terminal, and configured to generate a control signal by detecting a surge on the first node, wherein the switching unit includes a power transistor for connecting the first node to the first terminal so as to electrically connect the first power line to the ground terminal and wherein the first terminal is a terminal for detecting a fault in or damage to the power transistor.

In an embodiment, the switching unit may further include a first diode connected to the first power line; a second diode connected between the first terminal and the first node; a fuse connected between the first diode and the first node; a third capacitor connected between the first terminal and the ground terminal; a third resistor connected between the first terminal and the ground terminal; and a fourth diode connected between the first terminal and the ground terminal.

In an embodiment, the switching unit may further include a fifth diode connected between a second power line and the fuse.

In an embodiment, the signal determination unit may include a first capacitor connected to the first node; a second capacitor connected between a gate of the power transistor and the first terminal; a first resistor having a first end connected to the first capacitor; a second resistor connected between the gate of the power transistor and the first terminal; a third diode connected between a second end of the first resistor and the gate of the power transistor; and a Zener diode connected between the ground terminal and the gate of the power transistor.

In an embodiment, the surge protection apparatus may further include a filter including an inductor connected to the first power line; and a capacitor connected between the inductor and the ground terminal.

In an embodiment, the surge protection apparatus may further include an overvoltage protection element including an input inductor connected to the first power line; and a Metal Oxide Varistor (MOV) connected between the input inductor and the ground terminal.

BRIEF DESCRIPTION OF THE DRAWINGS

The accompanying drawings are provided to help the understanding of the present embodiments, and the embodiments are provided together with the detailed descriptions thereof. However, the technical features of the present embodiments are not limited to specific drawings, and the features disclosed in respective drawings may be combined to configure new embodiments.

DESCRIPTION OF THE PREFERRED EMBODIMENTS

Figure 1:
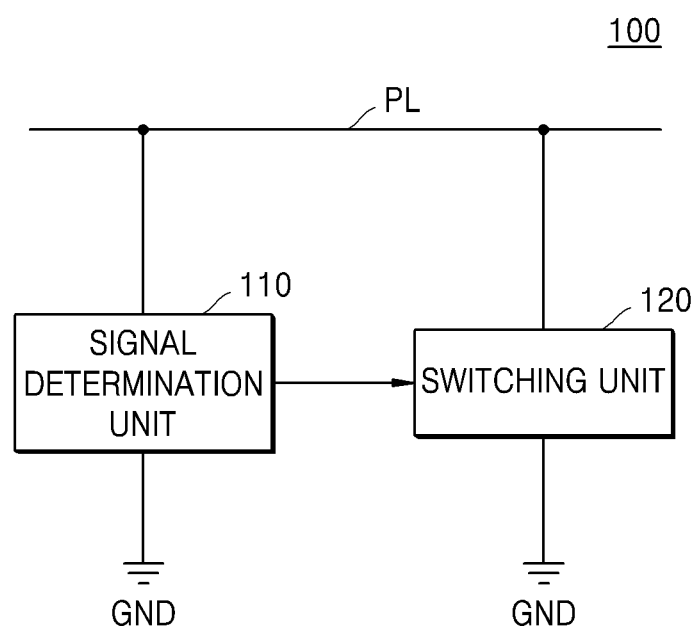
FIG. 1 is a diagram exemplarily illustrating a surge protection apparatus according to an embodiment of the present invention.

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. In the present invention, the singular forms are intended to include the plural forms as well, unless the context clearly indicates otherwise. It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Generally, a surge protection apparatus uses a Metal Oxide Varistor (MOV) device. The MOV is a nonlinear device that has a very high resistance value when the absolute value of a voltage across the two ends thereof is less than a specific value and that has a sharply decreasing resistance value when the absolute value of the voltage is equal to or greater than the specific value. The voltage across the two ends of the MOV at a through current of 1 mA is referred to as a "varistor voltage".

When the surge protection apparatus sufficiently decreases a pulse current, a High-altitude Electro-Magnetic Pulse (HEMP) protection apparatus may reduce the leakage current and voltage drop of a Radio-Frequency Interference (RFI) filter because the capacitance and inductance of a capacitor and an inductor included in the RFI filter are decreased. Therefore, it is desired to decrease the varistor voltage of the MOV, but as the varistor voltage approaches a rated voltage, the MOV is further stressed, and thus the lifespan of the MOV is shortened. As a result, there are limitations in the extent to which the capacitance and inductance of the capacitor and the inductor in the RFI filter can be decreased.

A surge protection apparatus according to an embodiment of the present invention may decrease the leakage current and the voltage drop of the RFI filter by sufficiently decreasing a pulse current in the Pulse Current Injection (PCI) test.

FIG. 1 is a diagram exemplarily illustrating a surge protection apparatus 100 according to an embodiment of the present invention. Referring to FIG. 1, the surge protection apparatus 100 may include a signal determination unit 110 connected between a power line PL and a ground terminal GND and a switching unit 120 connected between the power line PL and the ground terminal GND. The surge protection apparatus 100 according to the present invention may eliminate a surge that abnormally occurs on the power line PL.

The signal determination unit 110 may be implemented to determine whether an abnormal surge has occurred on the power line PL. For example, the signal determination unit 110 may generate a control signal using the difference between the frequency components of power and a surge when the occurrence of a surge is determined.

The switching unit 120 may determine whether to connect the power line PL to the ground terminal GND or to disconnect the power line PL from the ground terminal GND in response to the control signal (e.g. a surge detection signal). In other words, the switching unit 120 may determine whether to connect the power line PL to an electronic device or disconnect the power line PL from the electronic device in response to the control signal.

Figure 2:
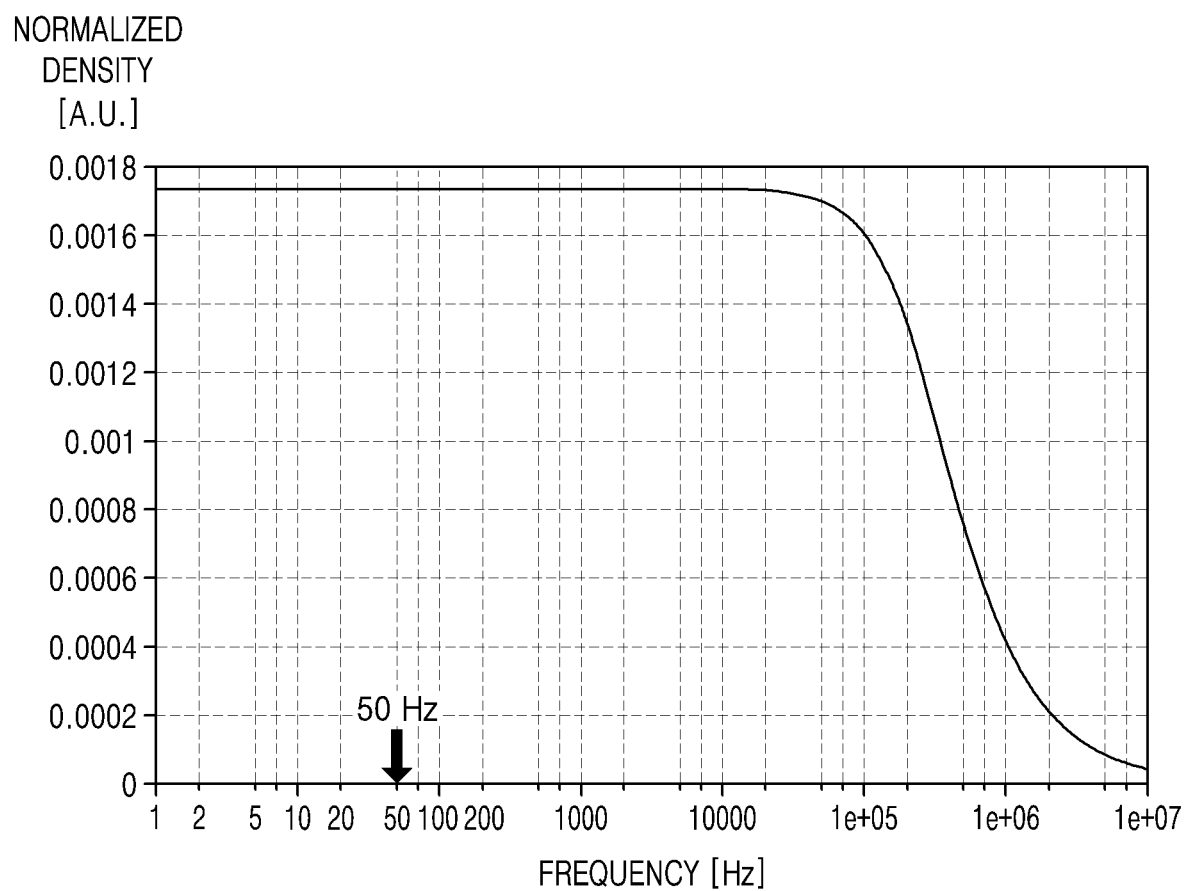
FIG. 2 is a diagram exemplarily illustrating the spectrum of a PCI short pulse according to an embodiment of the present invention.

FIG. 2 is a diagram exemplarily illustrating the spectrum of a PCI short pulse according to an embodiment of the present invention. Referring to FIG. 2, a short pulse (rising time=20 ns, half pulse width=500 ns) in a PCI test has a frequency component, the frequency bandwidth of which ranges from DC to 300 kHz (at −3 dB), which is much higher than that at 50/60 Hz AC power and at DC power.

Figure 3:
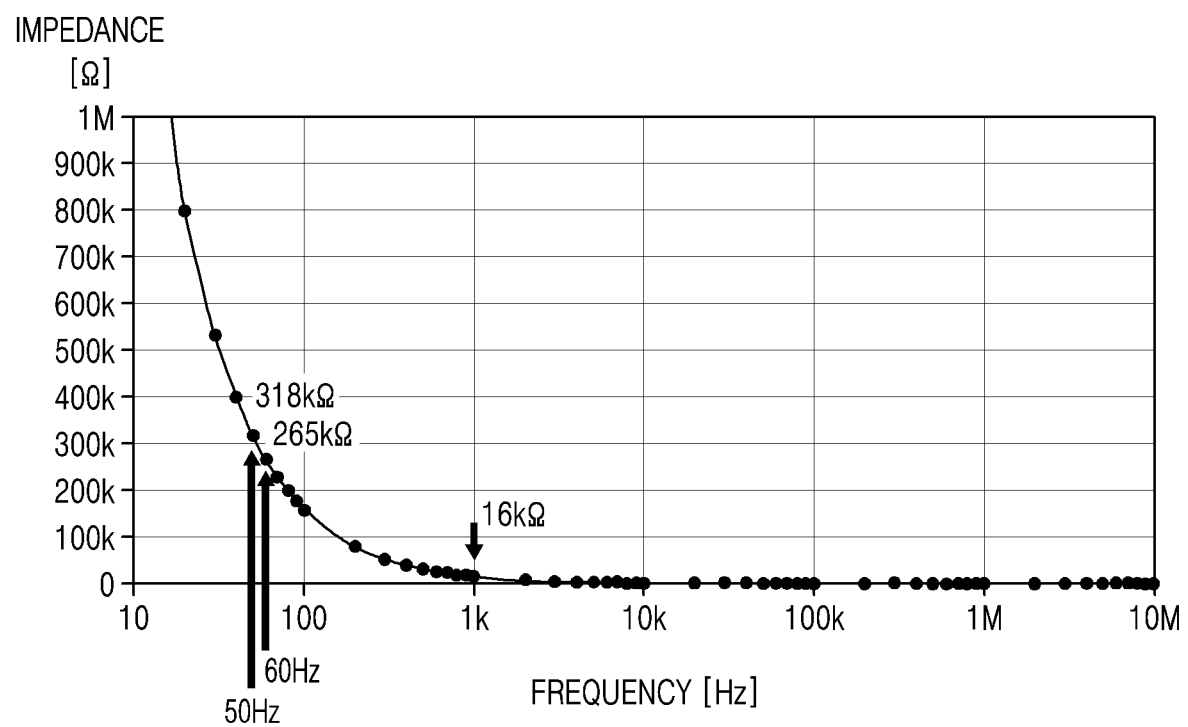
FIG. 3 is a diagram exemplarily illustrating the impedance graph of a capacitor in a surge protection apparatus.

FIG. 3 is a diagram exemplarily illustrating the impedance graph of a capacitor in a surge protection apparatus. Referring to FIG. 3, when a capacitor having a capacitance of 10 nF is used, the impedance of the capacitor is infinite at 0 Hz, and is 318 kΩ and 265 kΩ at 50 Hz and 60 Hz, respectively, and thus 50/60 Hz AC power and DC power can hardly pass through the capacitor. In contrast, impedance is less than 16 kΩ at frequencies of 1 kHz or higher, and thus some component of the short pulse can pass through the 10 nF capacitor, unlike 50/60 Hz AC power.

Figure 4:
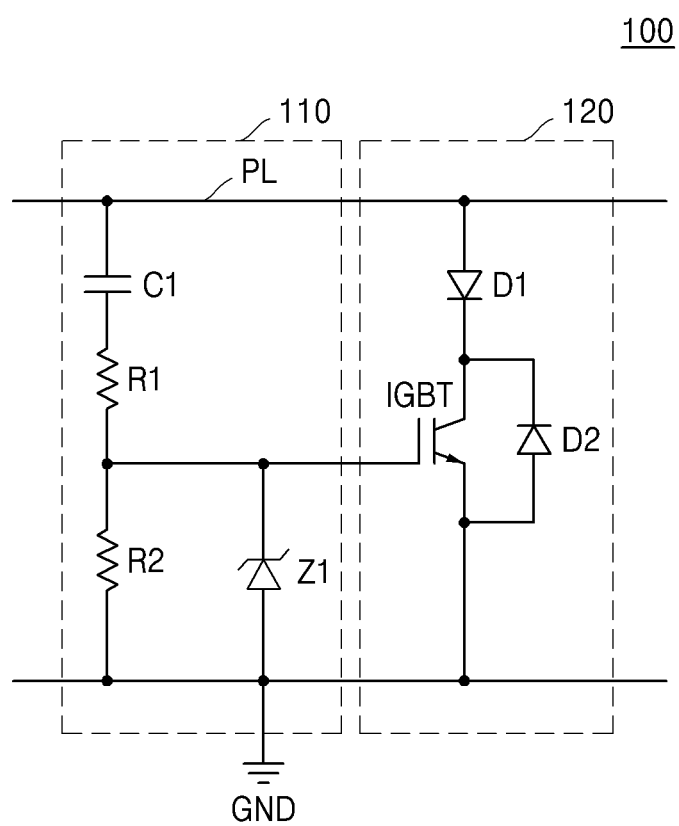
FIG. 4 is a diagram exemplarily illustrating a surge protection apparatus according to an embodiment of the present invention.

FIG. 4 is a diagram exemplarily illustrating a surge protection apparatus 100 according to an embodiment of the present invention. Referring to FIG. 4, the surge protection apparatus 100 may include a signal determination unit 110 and a switching unit 120.

The signal determination unit 110 may include a first capacitor C1, a first resistor R1, a second resistor R2, and a first Zener diode Z1. A first end of the first capacitor C1 may be connected to a power line PL, and a second end of the first capacitor C1 may be connected to a first end of the first resistor R1. A second end of the first resistor R1 may be connected to a first end of the second resistor R2, and a second end of the second resistor R2 may be connected to a ground terminal GND. A first end of the first Zener diode Z1 may be connected to the ground terminal GND, and a second end of the first Zener diode Z1 may be connected to the second end of the first resistor R1.

The switching unit 120 may include an Insulated-Gate Bipolar Transistor (IGBT) (hereinafter also referred to as a 'power transistor'), a first diode D1, and a second diode D2. The IGBT may include a gate connected to the second end of the first resistor R1, a collector connected both to a second end of the first diode D1 and to a second end of the second diode D2, and an emitter connected both to a first end of the second diode D2 and to the ground terminal GND.

Meanwhile, the configuration of the power transistor in the switching unit 120 according to the present invention is not limited to the IGBT. In addition to the IGBT of the switching unit 120 according to the present invention, various types of power transistors (e.g. a Silicon Carbide (SiC) transistor) may be used to implement the power transistor. Also, the switching unit 120 of the present invention may be implemented using a Bipolar Junction Transistor (BJT), a Metal Oxide Semiconductor Field Effect Transistor (MOSFET), a thyristor, or the like.

In an embodiment, the resistance of the signal determination unit 110 and the threshold voltage of the Zener diode may have values suitable for the gate input voltage of the IGBT in the switching unit.

Figure 5:
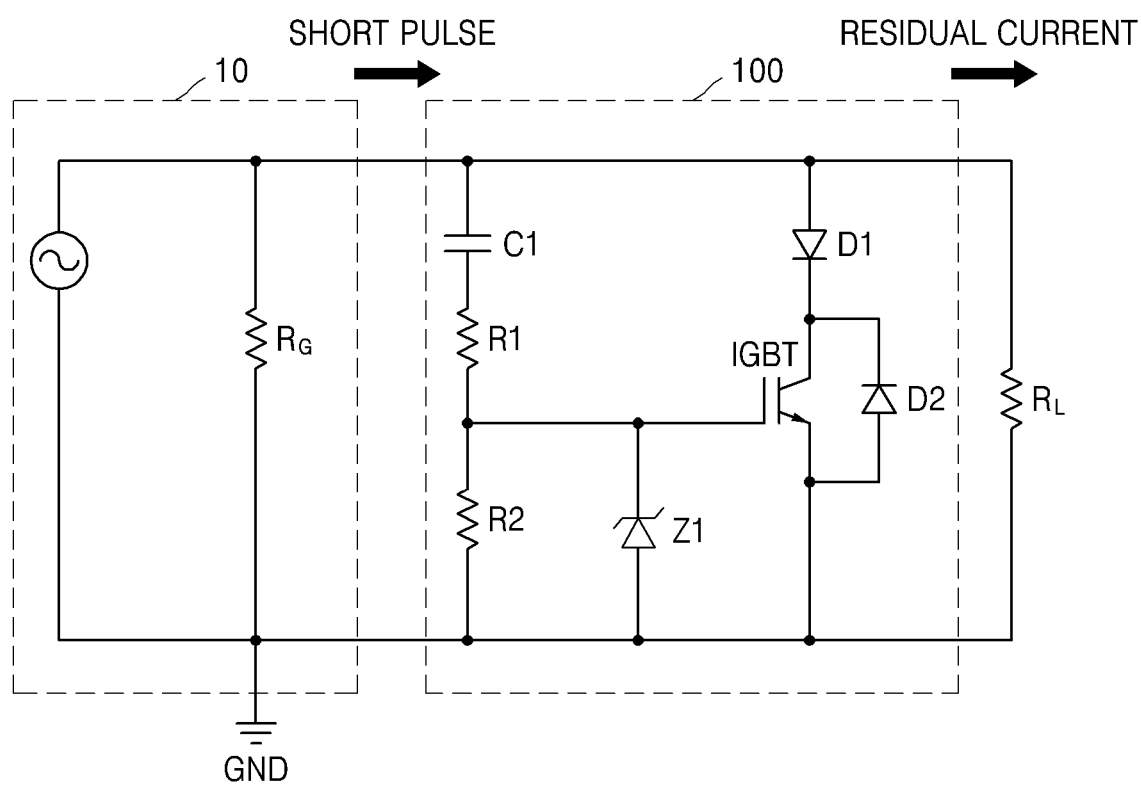
FIG. 5 is a diagram exemplarily illustrating a circuit in which an input signal source and a load resistor for PCI test conditions are added to the surge protection apparatus of FIG. 4.

FIG. 5 is a diagram exemplarily illustrating a circuit in which an input signal source 10 and a load resistor $R_L$ for PCI test conditions are added to the surge protection apparatus 100 of FIG. 4. The input signal source 10 may be composed of a power source and a resistor $R_G$, and may generate a short pulse. The load resistor $R_L$ may have a resistance of 2Ω.

Figure 6:
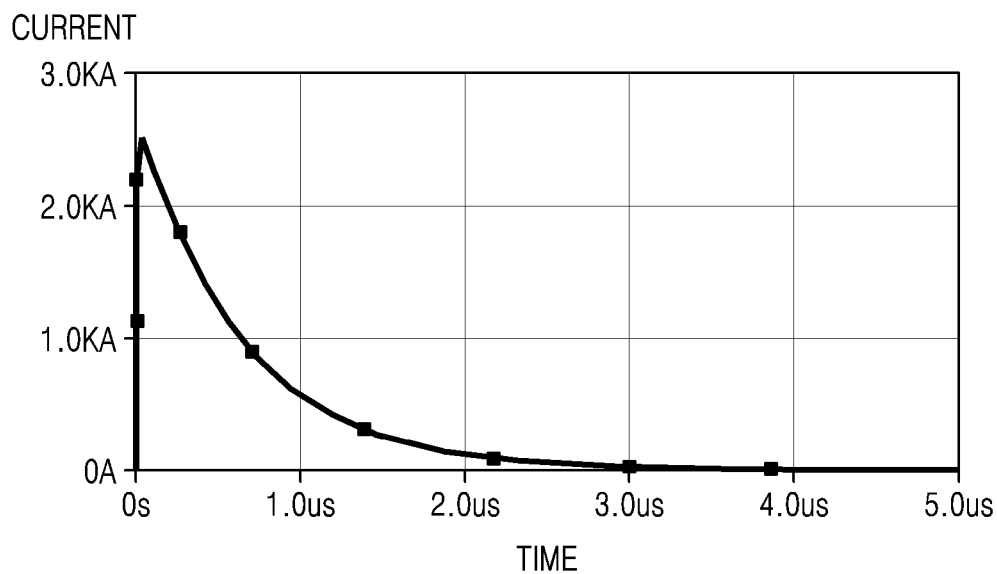
FIG. 6 is a diagram exemplarily illustrating a short pulse from an input signal source coupled to the surge protection apparatus.

FIG. 6 is a diagram exemplarily illustrating a short pulse from the input signal source 10 coupled to the surge protection apparatus 100.

Figure 7:
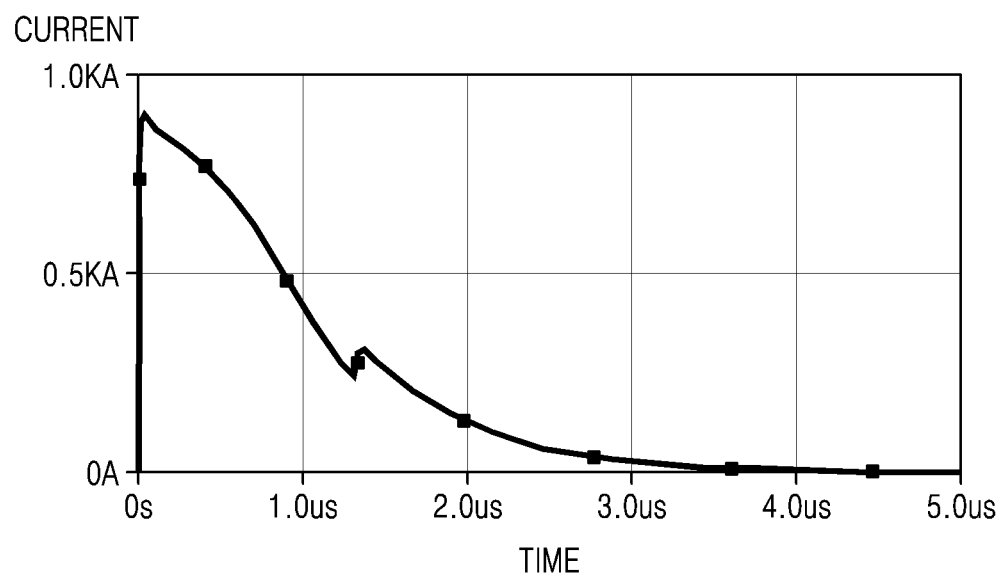
FIG. 7 is a diagram exemplarily illustrating a residual current flowing through the load resistor corresponding to the short pulse input from the input signal source in the surge protection apparatus.

FIG. 7 is a diagram exemplarily illustrating a residual current flowing through the load resistor $R_L$ corresponding to the short pulse input from the input signal source 10 in the surge protection apparatus 100. It can be seen that the maximum value of the residual current flowing through the load resistor $R_L$ is about 900 A.

Figure 8:
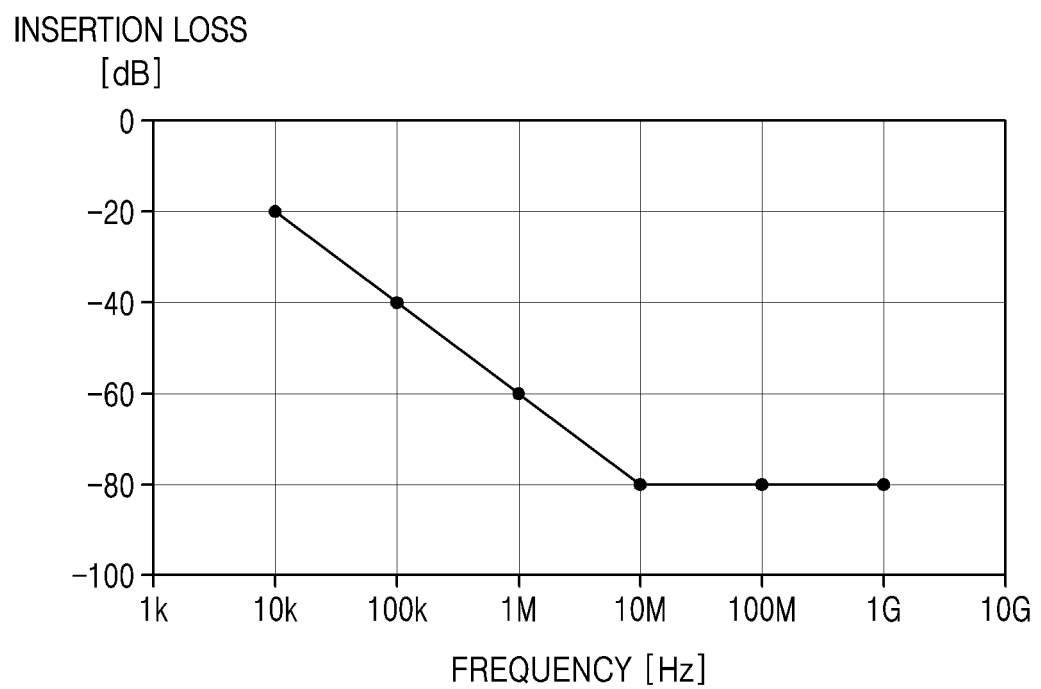
FIG. 8 is a diagram exemplarily illustrating insertion loss requirements according to the U.S. military standard MIL-STD-188-125.

FIG. 8 is a diagram exemplarily illustrating insertion loss requirements according to the U.S. military standard MIL-STD-188-125. Referring to FIG. 8, for HEMP protection, not only a typical PCI test but also insertion loss requirements must be satisfied.

Meanwhile, the surge protection apparatus according to an embodiment of the present invention may additionally include an RFI filter so as to satisfy insertion loss requirements.

Figure 9:
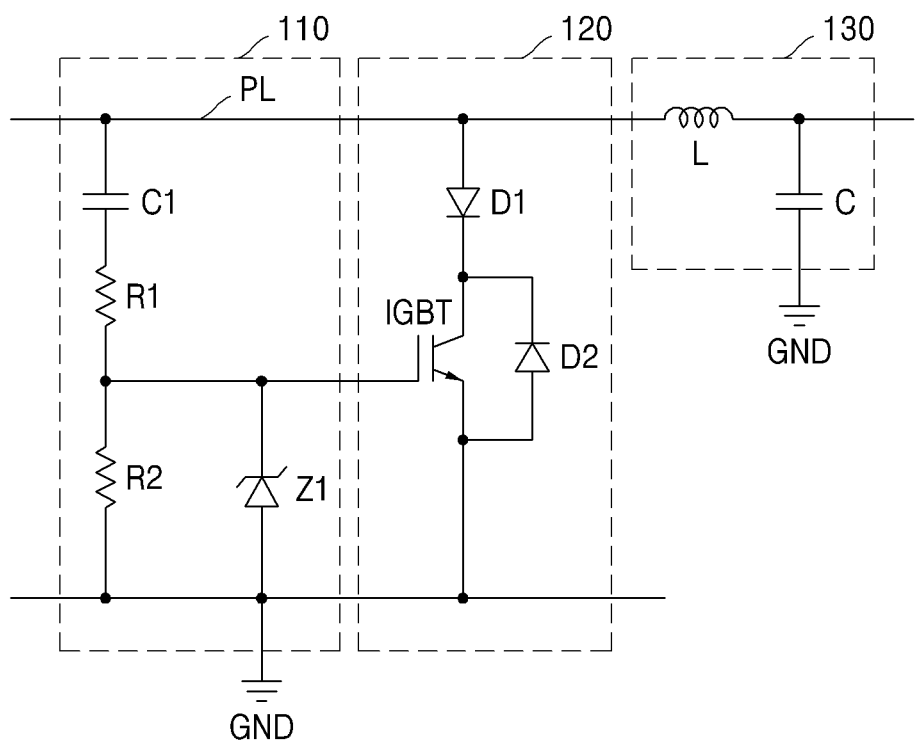
FIG. 9 is a diagram exemplarily illustrating a surge protection apparatus according to another embodiment of the present invention.

FIG. 9 is a diagram exemplarily illustrating a surge protection apparatus 100a according to another embodiment of the present invention. Referring to FIG. 9, the surge protection apparatus 100a may have a structure in which an LC filter 130 is added to the structure illustrated in FIG. 4.

In an embodiment, the RFI filter that satisfies insertion loss requirements may be implemented as the LC filter 130, as illustrated in FIG. 9.

Figure 10:
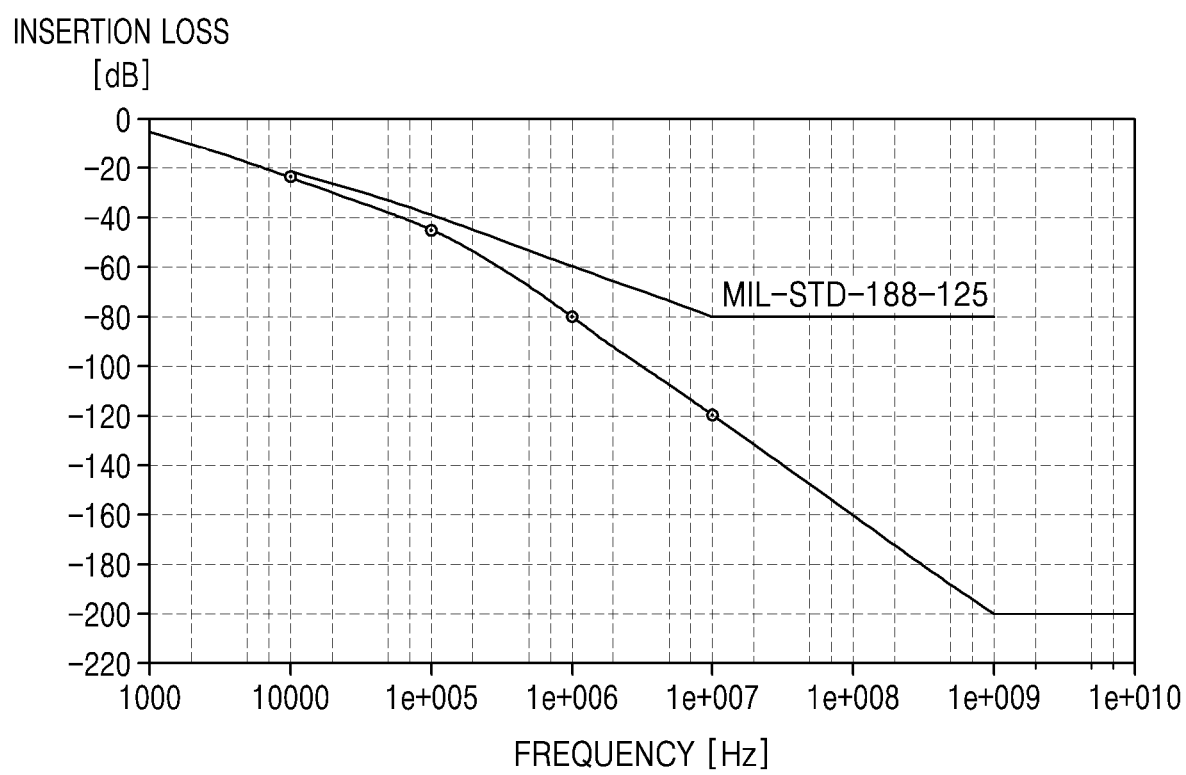
FIG. 10 is a diagram exemplarily illustrating the results of simulation of insertion loss of the surge protection apparatus of FIG. 9.

FIG. 10 is a diagram exemplarily illustrating the results of simulation of the insertion loss of the surge protection apparatus 100a of FIG. 9. In the simulation, an inductor L having an inductance of 50 µH and a capacitor C having a capacitance of 10 µF were used. As illustrated in FIG. 10, as a result of simulating the insertion loss, insertion loss requirements are satisfied.

Figure 11:
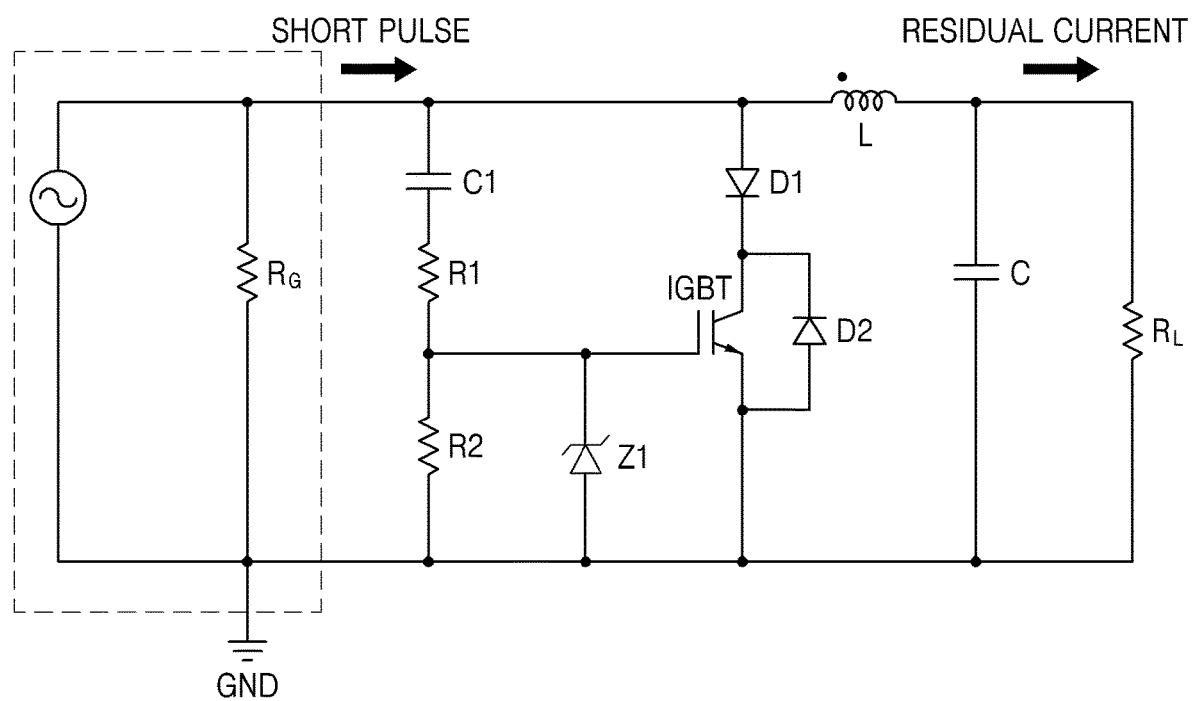
FIG. 11 is a diagram exemplarily illustrating a circuit in which an input signal source and a load resistor for PCI test conditions are added to the surge protection apparatus of FIG. 9.

FIG. 11 is a diagram exemplarily illustrating a circuit in which an input signal source 10 and a load resistor $R_L$ for PCI test conditions are added to the surge protection apparatus 100a of FIG. 9.

Figure 12:
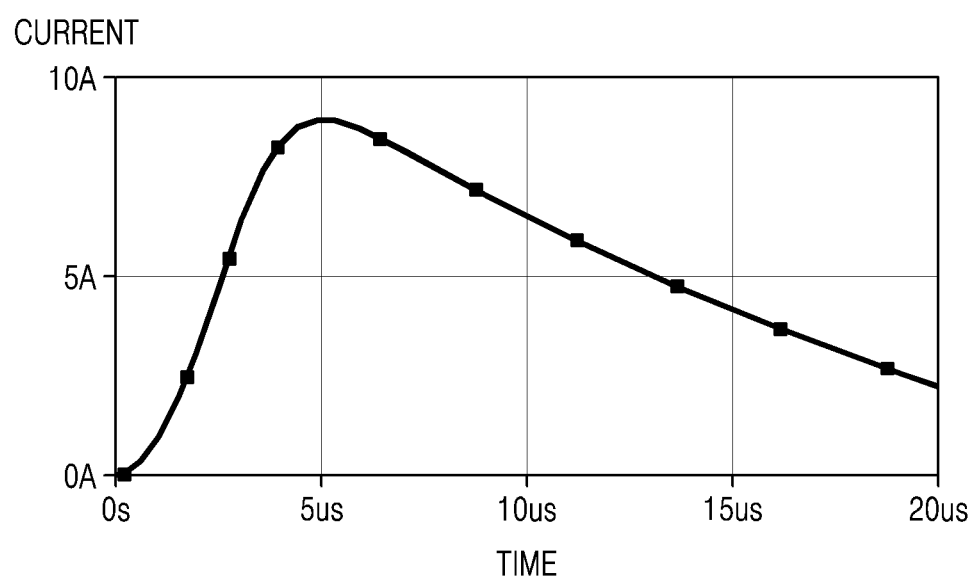
FIG. 12 is a diagram exemplarily illustrating a residual current flowing through the load resistor corresponding to a short pulse input from the input signal source in the surge protection apparatus of FIG. 9.

FIG. 12 is a diagram exemplarily illustrating a residual current flowing through the load resistor $R_L$ corresponding to a short pulse input from the input signal source 10 in the surge protection apparatus 100a of FIG. 9. Referring to FIG. 12, as a result of simulating the PCI test, the maximum value of the residual current is less than 10 A, and thus not only insertion loss requirements according to the U.S. military standard but also PCI test requirements may be satisfied.

Meanwhile, since the price of a Metal Oxide Varistor (MOV) is lower than that of an IGBT having the same current specification, a cheaper IGBT may be used if the MOV and an inductor are used in the input stage of the surge protection apparatus.

Figure 13:
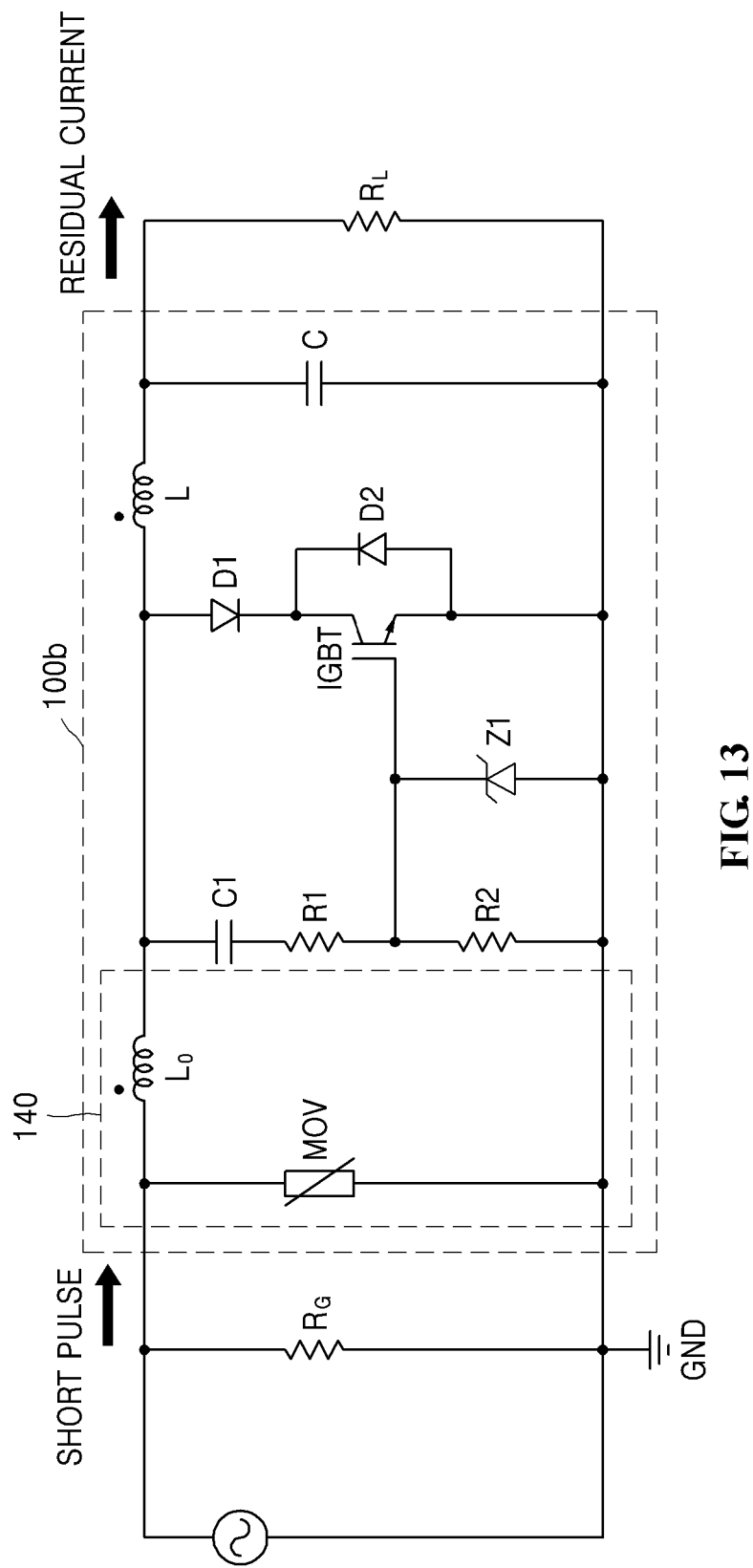
FIG. 13 is a diagram exemplarily illustrating a surge protection apparatus according to a further embodiment of the present invention.

FIG. 13 is a diagram exemplarily illustrating a surge protection apparatus 100b according to a further embodiment of the present invention. Referring to FIG. 13, the surge protection apparatus 100b may further include an overvoltage protection element 140, in contrast with the surge protection apparatus 100a illustrated in FIG. 9. The overvoltage protection element 140 may include a MOV and an input inductor $L_0$.

Figure 14:
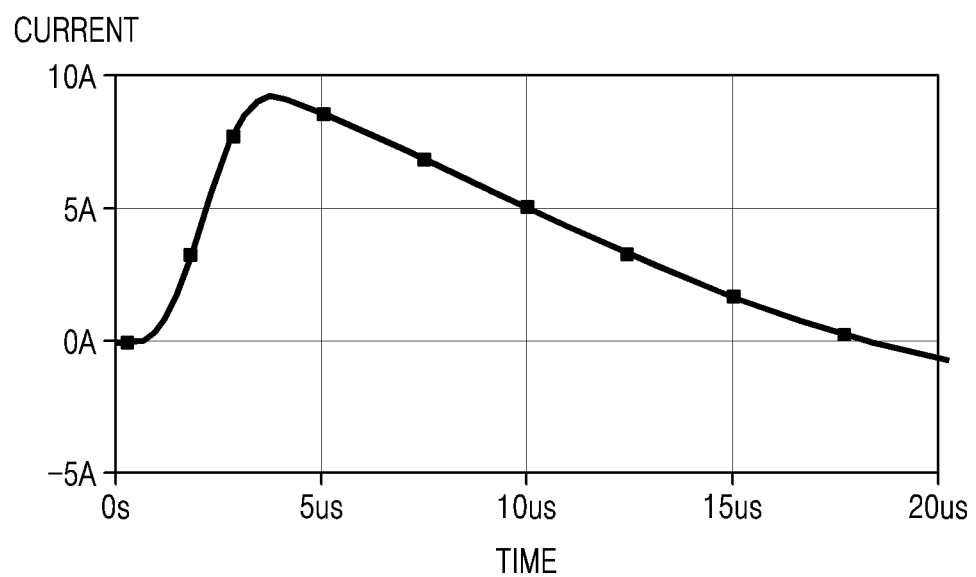
FIG. 14 is a diagram exemplarily illustrating a residual current flowing through a load resistor corresponding to a short pulse input from an input signal source in the surge protection apparatus of FIG. 13.

FIG. 14 is a diagram exemplarily illustrating a residual current flowing through a load resistor $R_L$ corresponding to a short pulse input from an input signal source 10 in the surge protection apparatus 100b of FIG. 13.

Figure 15:
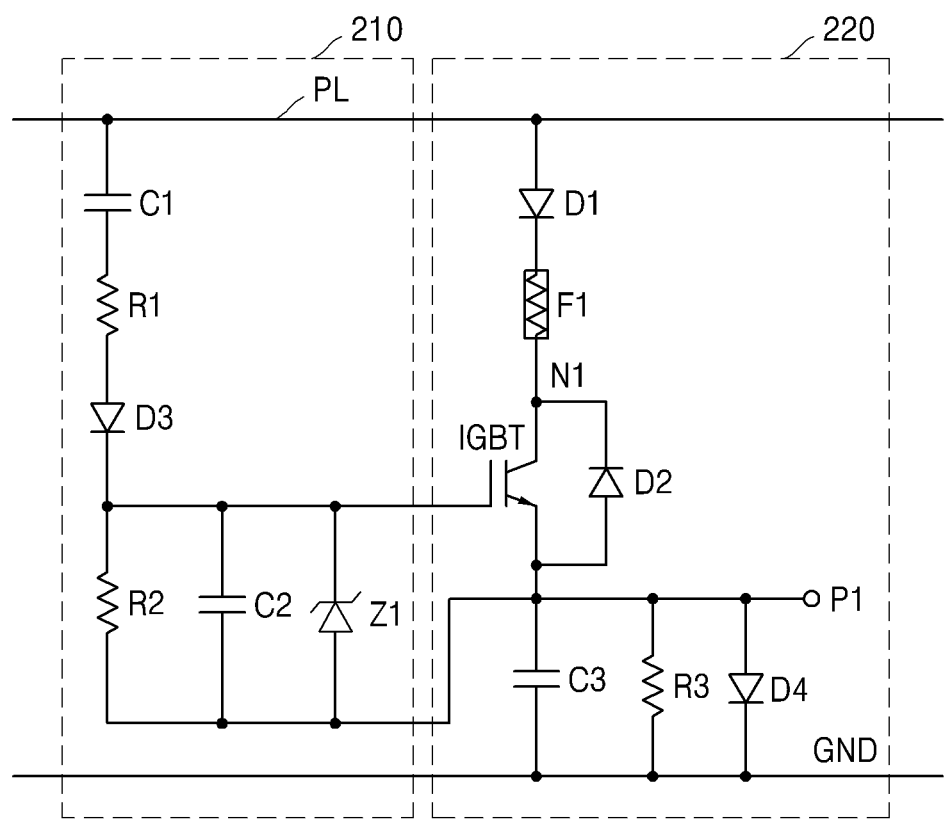
FIG. 15 is a diagram exemplarily illustrating a surge protection apparatus according to yet another embodiment of the present invention.

FIG. 15 is a diagram exemplarily illustrating a surge protection apparatus 200 according to yet another embodiment of the present invention. Referring to FIG. 15, the surge protection apparatus 200 may include a signal determination unit 210 and a switching unit 220.

The signal determination unit 210 may be implemented to gradually decrease the gate-input voltage of an IGBT by adding a third diode D3 and a second capacitor C2 to the signal determination unit 110 illustrated in FIG. 4. In this way, switching noise that may occur when the IGBT is rapidly turned off may be reduced. The third diode D3 may be connected between a first resistor R1 and the gate of the IGBT. The second capacitor C2 may be connected between the gate and the emitter of the IGBT.

The switching unit 220 may be implemented to provide a first terminal P1 for detecting a short circuit or an open circuit that may occur due to a fault in or damage to the IGBT by adding a fuse F1, a third capacitor C3, and a third resistor R3 to the switching unit 120 of FIG. 4. The fuse F1 may be connected between the first diode D1 and the collector of the IGBT, that is, a first node N1. The third resistor R3 may be connected between the emitter of the IGBT, that is, the first terminal P1, and a ground terminal GND. The fourth diode D4 may be connected between the first terminal P1 and the ground terminal GND.

Figure 16:
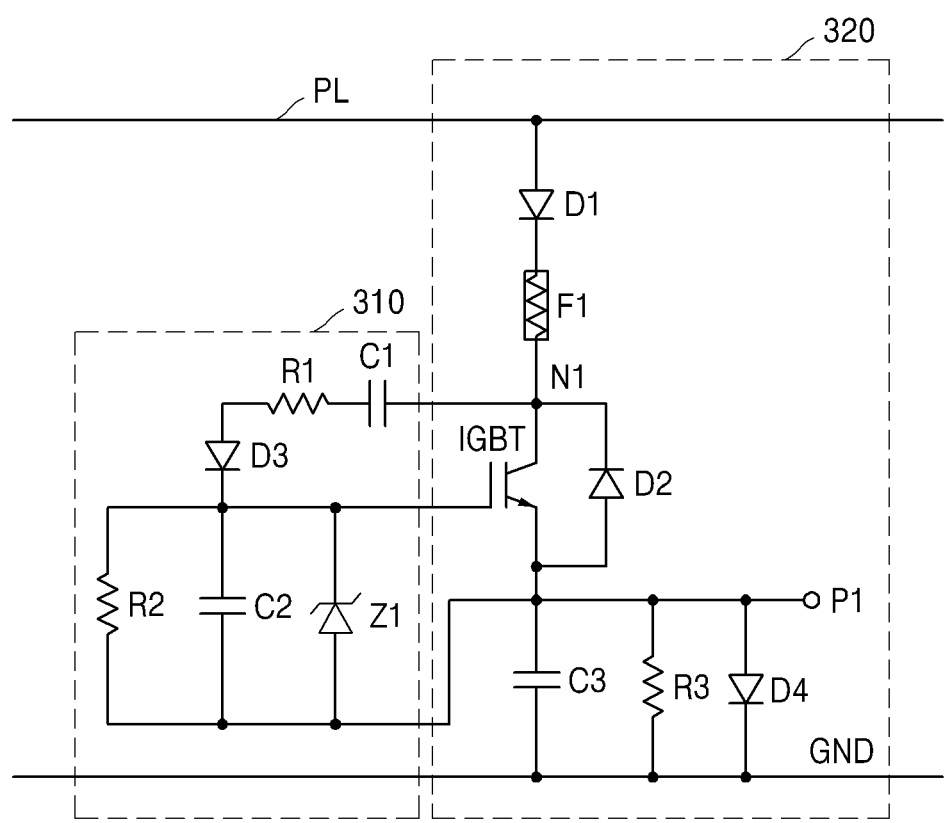
FIG. 16 is a diagram exemplarily illustrating a surge protection apparatus according to still another embodiment of the present invention.

FIG. 16 is a diagram exemplarily illustrating a surge protection apparatus 300 according to still another embodiment of the present invention. Referring to FIG. 16, the surge protection apparatus 300 may include a signal determination unit 310 and a switching unit 320. Here, the switching unit 320 may be implemented in the same way as the switching unit 220 illustrated in FIG. 15.

Compared to the signal determination unit 210 illustrated in FIG. 15, the signal determination unit 310 may be configured such that the gate-input signal of the IGBT is input through the diode D1 and the fuse F1 of the switching unit 320.

Figure 17:
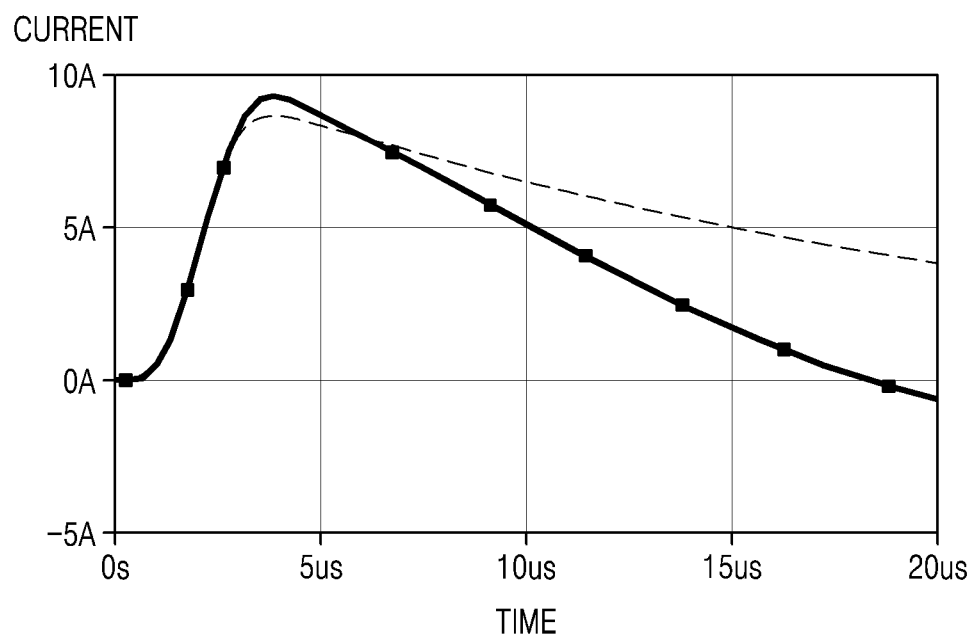
FIG. 17 is a diagram exemplarily illustrating a residual current in the results of simulation of a PCI test conducted in the surge protection apparatus of FIG. 13 and the surge protection apparatuses of FIGS. 15 and 16.

FIG. 17 is a diagram exemplarily illustrating a residual current in the results of simulation of a PCI test conducted in the surge protection apparatus 100b of FIG. 13 and the surge protection apparatuses 200 and 300 of FIGS. 15 and 16. The solid line indicates the case of the surge protection apparatus 100b of FIG. 13, and the dotted line indicates the case of the surge protection apparatuses 200 and 300 of FIGS. 15 and 16. It can be seen that the maximum value of the residual current is slightly decreased, thus enabling a surge protection function to be improved.

Figure 18:
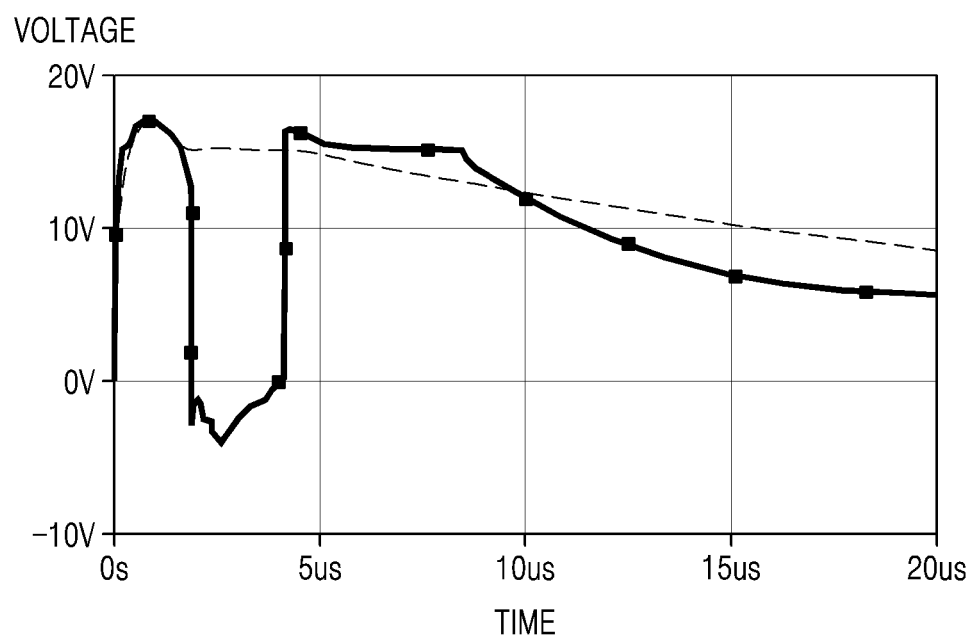
FIG. 18 is a diagram exemplarily illustrating the gate-emitter voltage waveform of an IGBT in the results of simulation of the PCI test conducted in the surge protection apparatus of FIG. 13 and the surge protection apparatuses of FIGS. 15 and 16.

FIG. 18 is a diagram exemplarily illustrating the gate-emitter voltage waveform of an IGBT in the results of simulation of the PCI test conducted in the surge protection apparatus 100b of FIG. 13 and the surge protection apparatuses 200 and 300 of FIGS. 15 and 16. The solid line indicates the case of the surge protection apparatus 100b of FIG. 13, and the dotted line indicates the case of the surge protection apparatuses 200 and 300 of FIGS. 15 and 16.

As illustrated in FIG. 18, the gate-emitter voltage of the IGBT is maintained for a predetermined period of time by adding a diode D3 and a capacitor C2 to each of the signal determination units 210 and 310.

Figure 19:
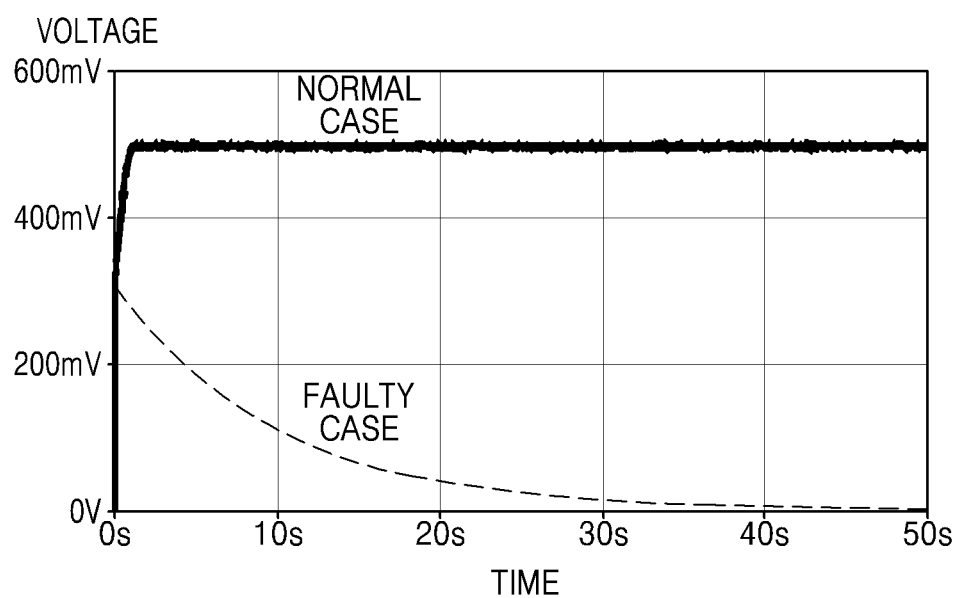
FIG. 19 is a diagram exemplarily illustrating the results of simulation of output voltages at a detection terminal in the case where an IGBT is normal (indicated by the solid line) and the case where the IGBT is short-circuited or open-circuited (indicated by the dotted line) when AC power of 220 V is applied to the surge protection apparatuses of FIGS. 15 and 16.

FIG. 19 is a diagram exemplarily illustrating the results of simulation of output voltages at a detection terminal P1 in the case (indicated by the solid line) where the IGBT is normal and in the case (indicated by the dotted line) where the IGBT is short-circuited or open-circuited when AC power of 220 V is applied to the surge protection apparatuses 200 and 300 of FIGS. 15 and 16.

When the voltage gradually approaches '0' with the lapse of time, it can be seen that the IGBT is abnormal. Since a high initial voltage is a temporary phenomenon appearing at the moment at which the AC power of 220 V is applied, the detection function is not influenced by the high initial voltage.

Meanwhile, when a power line is a single-phase power line, the surge protection apparatus according to an embodiment of the present invention may be implemented using a structure in which the IGBT of a switching unit is shared between two lines (i.e. a hot (H) line and a neutral (N) line).

Figure 20:
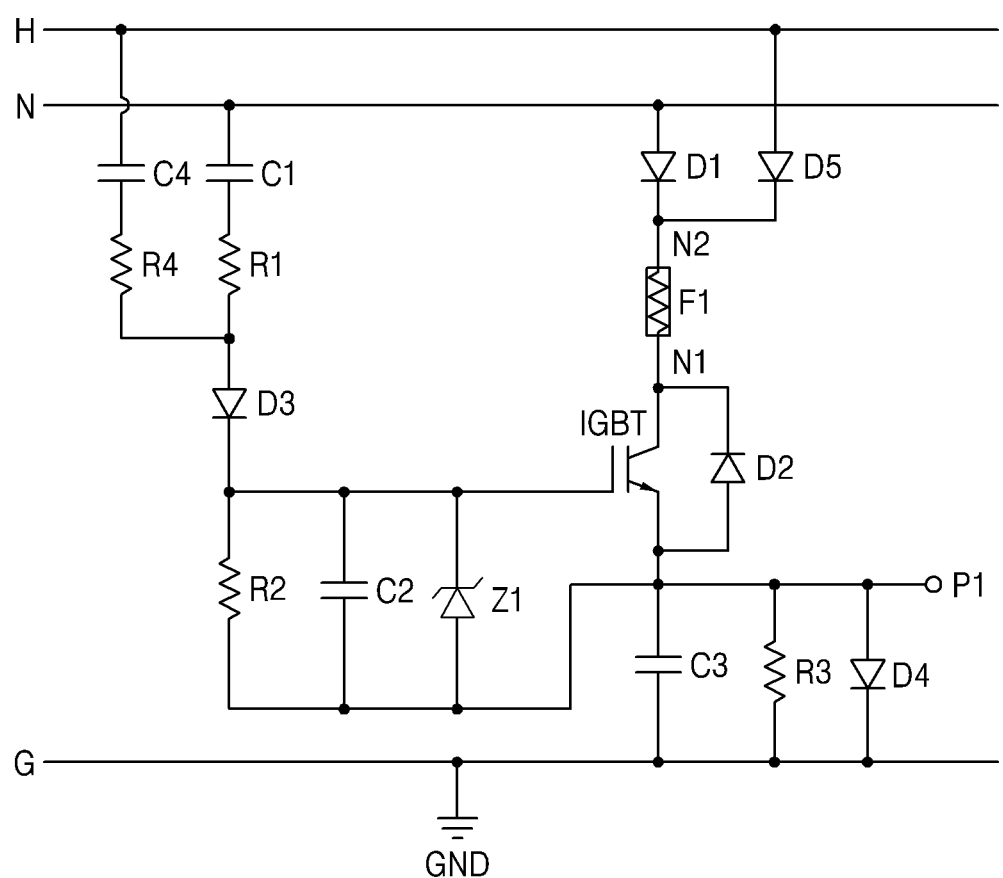
FIG. 20 is a diagram exemplarily illustrating a surge protection apparatus in which the surge protection apparatus of FIG. 15 is applied to a single-phase power line.

FIG. 20 is a diagram exemplarily illustrating a surge protection apparatus 400 in which the surge protection apparatus 200 of FIG. 15 is applied to a single-phase power line. Referring to FIG. 20, the surge protection apparatus 400 may include a first capacitor C1 connected to a first power line N, a first resistor R1 having a first end connected to the first capacitor C1, a fourth capacitor C4 connected to a second power line H, a fourth resistor R4 connected to the fourth capacitor C4, a third diode D3 connected between a second end of the first resistor R1 and a gate of the IGBT, a second resistor R2 connected between the gate of the IGBT and a first terminal P1, a second capacitor C2 connected between the gate of the IGBT and the first terminal P1, a first Zener diode Z1 connected between the gate of the IGBT and the first terminal P1, a first diode D1 connected between the first power line N and a fuse F1, a fifth diode D5 connected between the second power line H and the fuse F1, a second diode D2 connected between a collector N1 and an emitter P1 of the IGBT, a third capacitor C3 connected between the first terminal P1 and a ground line G, a third resistor R3 connected between the first terminal P1 and the ground line G, and a fourth diode D4 connected between the first terminal P1 and the ground line G. In an embodiment, the ground line G may be connected to a ground terminal GND.

In an embodiment, the fuse F1 may be connected between the first node N1 and a second node N2. The first diode D1 may be connected between the first power line N and the second node N2, and the fourth diode D4 may be connected between the second power line H and the second node N2.

In an embodiment, the IGBT of the switching unit may be turned on in response to a control signal in order to electrically connect the first power line N and the second power line H to the ground terminal GND.

Figure 21:
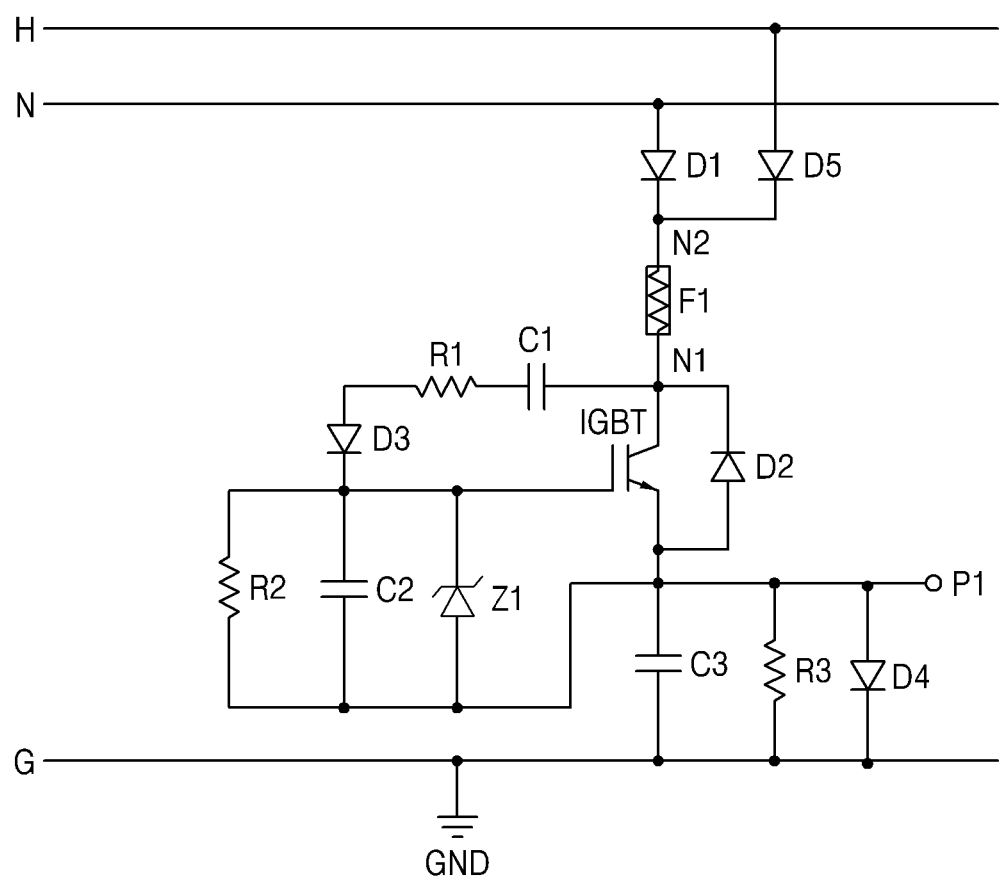
FIG. 21 is a diagram exemplarily illustrating a surge protection apparatus in which the surge protection apparatus of FIG. 16 is applied to a single-phase power line.

FIG. 21 is a diagram exemplarily illustrating a surge protection apparatus 500 in which the surge protection apparatus 300 of FIG. 16 is applied to a single-phase power line. Referring to FIG. 21, the surge protection apparatus 500 may include a first diode D1 connected between a first power line N and a fuse F1, a fifth diode D5 connected between a second power line H and the fuse F1, a second diode D2 connected between a collector and an emitter of an IGBT, a first capacitor C1 connected to the collector of the IGBT, a first resistor R1 having a first end connected to the first capacitor C1, a third diode D3 connected between a second end of the first resistor R1 and a gate of the IGBT, a second resistor R2 connected between the gate of the IGBT and a first terminal P1, a second capacitor C2 connected between the gate of the IGBT and the first terminal P1, a first Zener diode Z1 connected between the gate of the IGBT and the first terminal P1, a third capacitor C3 connected between the first terminal P1 and a ground line G, a third resistor R3 connected between the first terminal P1 and the ground line G, and a fourth diode D4 connected between the first terminal P1 and the ground line G. In an embodiment, the ground line G may be connected to a ground terminal GND.

Meanwhile, the present invention may use a current transformer (CT) so as to determine whether the IGBT is faulty.

Figure 22:
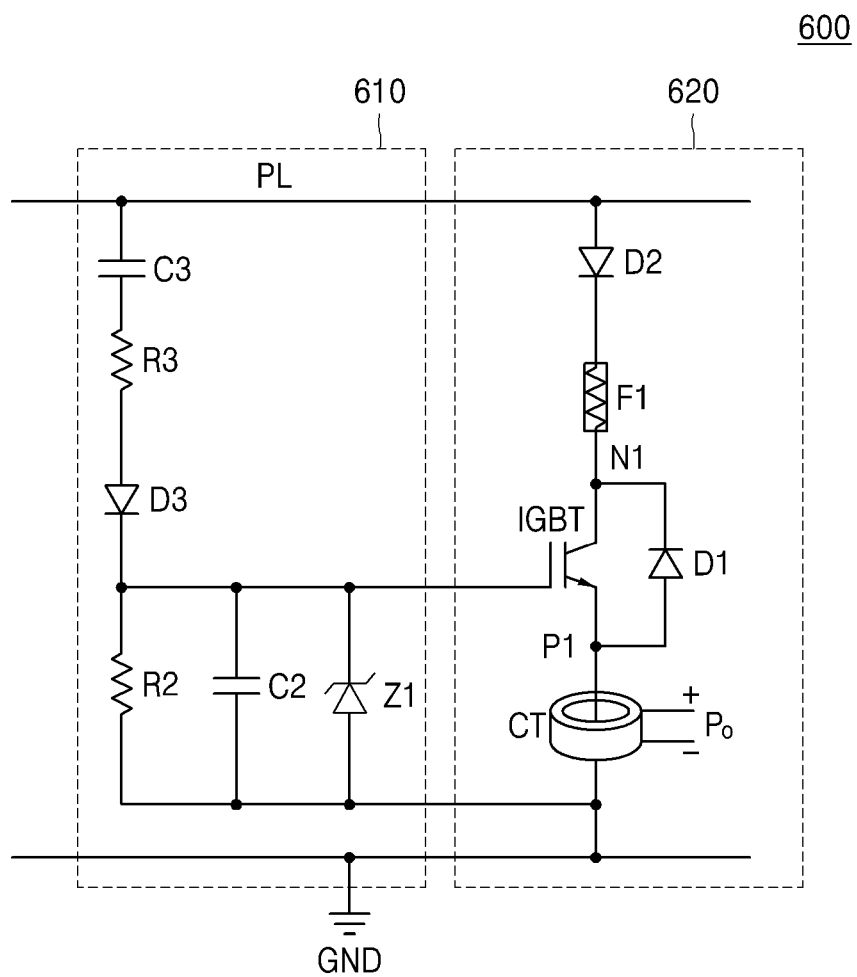
FIG. 22 is a diagram exemplarily illustrating a surge protection apparatus using a current transformer according to an embodiment of the present invention.

FIG. 22 is a diagram exemplarily illustrating a surge protection apparatus 600 using a current transformer according to an embodiment of the present invention. Referring to FIG. 22, the surge protection apparatus 600 may include a signal determination unit 610 and a switching unit 620.

The signal determination unit 610 may include a second capacitor C2 connected between a gate of a power transistor IGBT and a ground terminal GND, a second resistor R2 connected between the gate of the power transistor IGBT and the ground terminal GND, a Zener diode Z1 connected between the ground terminal GND and the gate of the power transistor IGBT, a third capacitor C3 connected to a power line PL, a third resistor R3 having a first end connected to the third capacitor C3, and a third diode D3 connected between a second end of the third resistor R3 and the gate of the power transistor IGBT.

The switching unit 620 may include the power transistor IGBT, a first diode D1 connected between a first terminal P1 and a first node N1, a second diode D2 connected to the power line PL, a fuse F1 connected between the second diode D2 and the first node N1, and a current transformer CT connected between the first terminal P1 and the ground terminal GND.

Figure 23:
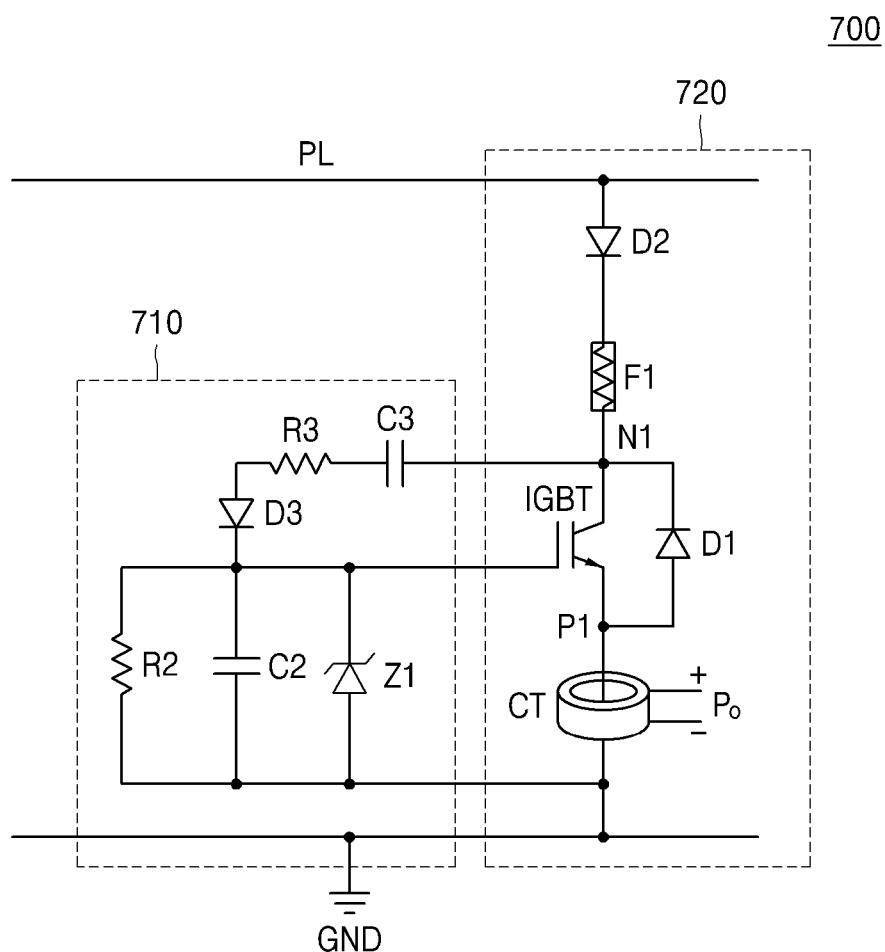
FIG. 23 is a diagram exemplarily illustrating a surge protection apparatus using a Current Transformer (CT) according to another embodiment of the present invention.

FIG. 23 is a diagram exemplarily illustrating a surge protection apparatus 700 using a current transformer according to another embodiment of the present invention. Referring to FIG. 23, the surge protection apparatus 700 may include a signal determination unit 710 and a switching unit 720.

The signal determination unit 710 may include a second capacitor C2 connected between a gate of a power transistor IGBT and a ground terminal GND, a second resistor R2 connected between the gate of the power transistor IGBT and the ground terminal GND, a Zener diode Z1 connected between the ground terminal GND and the gate of the power transistor IGBT, a third capacitor C3 connected to a first node N1, a third resistor R3 having a first end connected to the third capacitor C3, and a third diode D3 connected between a second end of the third resistor R3 and the gate of the power transistor IGBT.

The switching unit 720 may include the power transistor IGBT, a first diode D1 connected between a first terminal P1 and the first node N1, a second diode D2 connected to the power line PL, a fuse F1 connected between the second diode D2 and the first node N1, and a current transformer CT connected between the first terminal P1 and the ground terminal GND.

Figure 24:
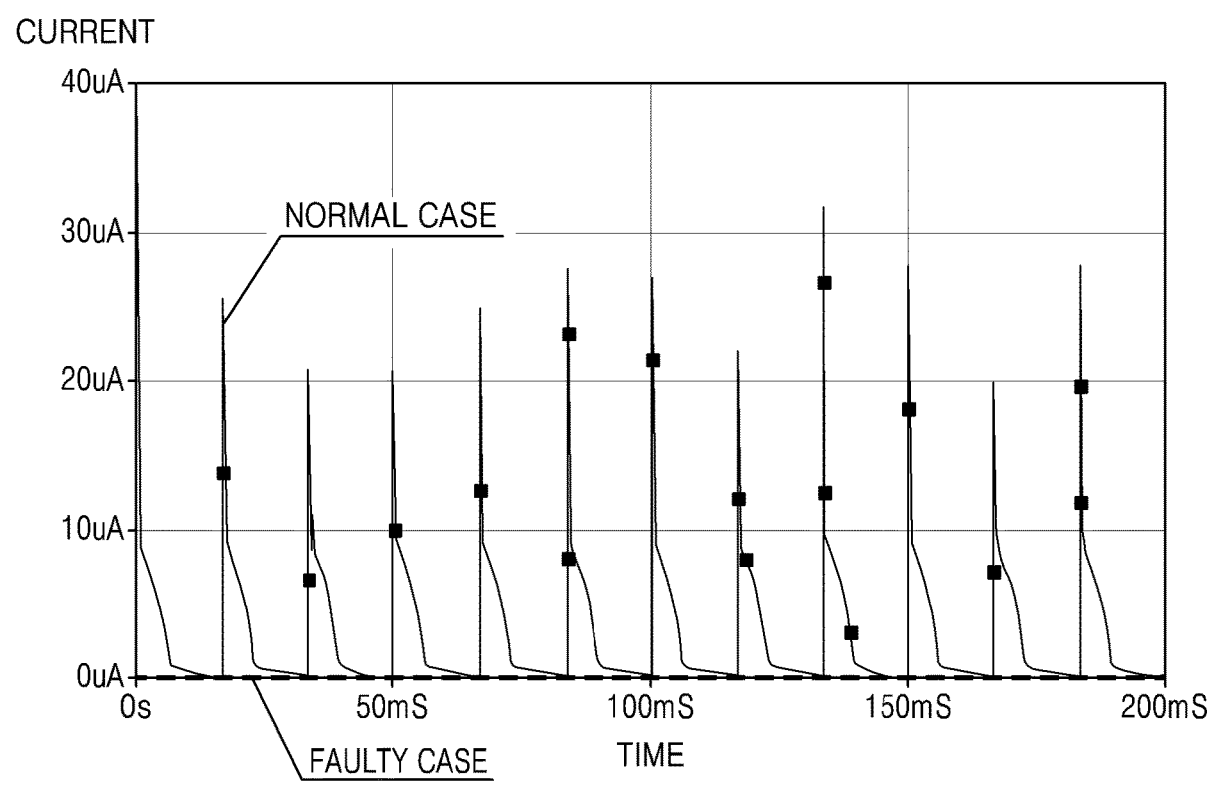
FIG. 24 is a diagram exemplarily illustrating the results of detection by a CT when AC power of 60 Hz 220 V is applied.

FIG. 24 is a diagram exemplarily illustrating the results of detection by the power transformer CT when AC power of 60 Hz 220 V is applied. Referring to FIG. 24, in the case (indicated by the solid line) where the IGBT is normal, a periodic signal of 60 Hz may be detected. Therefore, when the average of P1 signals is obtained or a component of 60 Hz is calculated, whether the IGBT is normal may be determined. In the case (indicated by the dotted line) where the IGBT is faulty, current may be '0'.

Meanwhile, FIGS. 15, 16, 22, and 23 may be applied not only to a single-phase power line but also to a three-phase or four-phase power line. The surge protection apparatus according to embodiments of the present invention may be implemented in a similar structure even in the case of the three-phase power line. The surge protection apparatus according to an embodiment of the present invention may more effectively decrease a surge or a transient voltage/current induced on the power line.

The surge protection apparatus according to embodiments of the present invention may more effectively decrease a surge or a transient voltage/current induced on a power line by determining a signal on the power line and then turning on/off a power device.

Meanwhile, the descriptions of the present invention are only detailed embodiments for practicing the present invention. The present invention may include not only means itself that is detailed and is actually available but also the technical spirit indicating abstract and conceptual ideas that can be utilized as technology in the future.

What is claimed is:

1. A surge protection apparatus comprising:
   a signal determination unit configured to generate a control signal by detecting a surge on a power line; and
   a switching unit connected between the power line and a ground terminal,
   wherein the switching unit is configured to comprise:
      a power transistor that is turned on in response to the control signal;
      a first diode connected between the power line and a collector of the power transistor; and
      a second diode connected between the ground terminal and the collector of the power transistor.

2. The surge protection apparatus of claim 1, wherein the power transistor is implemented as any one of an Insulated Gate Bipolar Transistor (IGBT), a Bipolar Junction Transistor (BJT), a Metal Oxide Semiconductor Field Effect Transistor (MOSFET), a thyristor, and a Silicon carbide (SiC) transistor.

3. The surge protection apparatus of claim 1, wherein the signal determination unit comprises:
   a first capacitor connected to the power line;
   a first resistor connected between the first capacitor and a gate of the power transistor;
   a second resistor connected between the gate of the power transistor and the ground terminal; and
   a Zener diode connected between the ground terminal and the gate of the power transistor.

4. The surge protection apparatus of claim 1, further comprising a filter comprising:
   an inductor connected to the power line; and
   a capacitor connected between the inductor and the ground terminal.

5. The surge protection apparatus of claim 1, further comprising an overvoltage protection element comprising:
   an input inductor connected to the power line; and
   a Metal Oxide Varistor (MOV) connected between the input inductor and the ground terminal.

6. The surge protection apparatus of claim 3, further comprising a filter comprising:
   an inductor connected to the power line; and
   a capacitor connected between the inductor and the ground terminal.

7. The surge protection apparatus of claim 3, further comprising an overvoltage protection element comprising:
   an input inductor connected to the power line; and
   a Metal Oxide Varistor (MOV) connected between the input inductor and the ground terminal.

8. The surge protection apparatus of claim 4, further comprising an overvoltage protection element comprising:
   an input inductor connected to the power line; and
   a Metal Oxide Varistor (MOV) connected between the input inductor and the ground terminal.

9. A surge protection apparatus comprising:
   a signal determination unit configured to generate a control signal by detecting a surge on a power line; and
   a switching unit connected between the power line and a ground terminal and configured to comprise a power transistor that is turned on in response to the control signal,
   wherein the signal determination unit comprises:
   a first capacitor connected to the power line;
   a first resistor connected between the first capacitor and a gate of the power transistor;

a second resistor connected between the gate of the power transistor and the ground terminal; and a Zener diode connected between the ground terminal and the gate of the power transistor.

10. The surge protection apparatus of claim 9, further comprising a filter comprising:

an inductor connected to the power line; and a capacitor connected between the inductor and the ground terminal.

11. The surge protection apparatus of claim 9, further comprising an overvoltage protection element comprising:

an input inductor connected to the power line; and a Metal Oxide Varistor (MOV) connected between the input inductor and the ground terminal.

12. The surge protection apparatus of claim 10, further comprising an overvoltage protection element comprising:

an input inductor connected to the power line; and a Metal Oxide Varistor (MOV) connected between the input inductor and the ground terminal.

* * * * *